(12) United States Patent
Ejury

(10) Patent No.: US 9,086,705 B2
(45) Date of Patent: Jul. 21, 2015

(54) CHARGE RECOVERY IN POWER CONVERTER DRIVER STAGES

(75) Inventor: Jens Ejury, Fremont, CA (US)

(73) Assignee: Infineon Technologies Austria AG, Villach (AT)

( * ) Notice: Subject to any disclaimer, the term of this patent is extended or adjusted under 35 U.S.C. 154(b) by 547 days.

(21) Appl. No.: 13/553,097

(22) Filed: Jul. 19, 2012

(65) Prior Publication Data

US 2014/0021932 A1  Jan. 23, 2014

(51) Int. Cl.
*H02M 3/156* (2006.01)
*G05F 3/02* (2006.01)
*H03K 17/30* (2006.01)

(52) U.S. Cl.
CPC ........................................ *G05F 3/02* (2013.01)

(58) Field of Classification Search
CPC .............. H03K 17/063; H03K 17/302; H03K 17/6874; H03K 17/04206
USPC ........... 323/282, 289, 351; 327/108, 109, 376
See application file for complete search history.

(56) References Cited

U.S. PATENT DOCUMENTS

| 2004/0124818 | A1* | 7/2004 | Dequina et al. | 323/282 |
| 2011/0163732 | A1 | 7/2011 | Sapp et al. | |
| 2012/0032657 | A1* | 2/2012 | Dequina | 323/271 |

OTHER PUBLICATIONS

Author Unknown. "Examination of Reverse Recovery Losses in a Synchronous Buck Converter Circuit." Silicon Semiconductor Corporation, 2003. Available online at: http://bbs.dianyuan.com/bbs/u/41/1148348695.pdf.
Lemieux, G. et al. "SoC Energy Savings=Reduce+Reuse+Recycle: A Case Study Using a 660MHz DC-DC Converter with Integrated Output Filter." Canadian Conference on Electrical and Computer Engineering (CCECE 2008), May 4-7, 2008.

* cited by examiner

*Primary Examiner* — Gary L Laxton
(74) *Attorney, Agent, or Firm* — Murphy, Bilak & Homiller, PLLC

(57) ABSTRACT

A power converter includes a first transistor operable to source current to a load when switched on, a second transistor operable to freewheel inductor current or sink current from the load when switched on, and a driver circuit. The driver circuit is operable to switch the first transistor on and the second transistor off during a first period, switch the first transistor off and the second transistor on during a third period after the first period, and connect a gate of the first transistor to a gate of the second transistor during a second period between the first and third periods when the gates of both transistors are floating.

23 Claims, 4 Drawing Sheets

CHARGE RECOVERY IN POWER CONVERTER DRIVER STAGES

FIELD OF TECHNOLOGY

The present application relates to power converter driver stages, in particular charge recovery in power converter driver stages.

BACKGROUND

Switching power converters are widely used for high power applications because of their high efficiency and small size. Converter efficiency is increasingly important at low and medium power levels. For example, buck converters are particularly well suited for providing high current at low voltages required by state of the art high performance integrated circuits such as microprocessors, graphics processors, and network processors. In general, buck converters are typically implemented with active components such as a pulse width modulation controller (PWM), driver, power MOSFETs (metal oxide semiconductor field effect transistors), and passive components such as inductors, transformers or coupled inductors, capacitors, and resistors.

Most conventional buck converters use direct drive for switching on the MOSFETs of the power stage. The energy used for the gate drive process is then typically dissipated. Some conventional approaches attempt to recover part of the gate drive energy by storing the energy in external capacitors, which increases the complexity of the driver because an additional pin and external components are required. The storage capacitance instead can be integrated within the driver, but doing so increases the size and cost of the driver circuit.

SUMMARY

According to the embodiments described herein, the gate charge of a high-side transistor of a power stage driver circuit is recovered and used to directly pre-charge the low-side transistor of the driver circuit. No additional external or internal capacitor is used to store the gate charge of the high-side transistor. Instead, the gate capacitance of the high-side transistor is used to directly pre-charge the low-side transistor to a secure level below its turn-on threshold.

According to an embodiment of a power converter, the power converter comprises a first transistor operable to source current to a load when switched on, a second transistor operable to freewheel inductor current or sink current from the load when switched on, and a driver circuit. The driver circuit is operable to switch the first transistor on and the second transistor off during a first period, switch the first transistor off and the second transistor on during a third period after the first period, and connect a gate of the first transistor to a gate of the second transistor during a second period between the first and third periods when the gates of the high-side and low-side transistors are floating.

According to an embodiment of a method of operating a power converter, the method comprises: coupling a high-side transistor to a load through an inductor; coupling a low-side transistor to the load through the inductor; switching the high-side transistor on and the low-side transistor off during a first period; switching the high-side transistor off and the low-side transistor on during a third period after the first period; and connecting a gate of the high-side transistor to a gate of the low-side transistor during a second period between the first and third periods when the gates of the high-side and low-side transistors are floating.

According to another embodiment of a power converter, the power converter comprises a high-side transistor for coupling to a load through an inductor, a low-side transistor for coupling to the load through the inductor, and a driver circuit. The driver circuit is operable to switch the high-side and low-side transistors on and off at different periods to supply power to the load, and connect a gate of the high-side transistor to a gate of the low-side transistor so that energy stored in a gate-to-source capacitance of the high-side transistor is directly transferred to the gate to source capacitance of the low-side transistor during periods when the gates of the high-side and low-side transistors are floating.

According to an embodiment of a synchronous buck converter, the synchronous buck converter comprises an output inductor for coupling to a load, a first transistor operable to source current to the load through the output inductor when switched on, a second transistor operable to freewheel the inductor current or sink current from the load through the inductor when switched on, and a driver circuit. The driver circuit is operable to switch the first transistor on and the second transistor off during a first period, switch the first transistor off and the second transistor on during a third period after the first period, and connect a gate of the first transistor to a gate of the second transistor during a second period between the first and third periods when the gates of the high-side and low-side transistors are floating.

According to an embodiment of a power stage driver, the power stage driver comprises circuitry operable to switch a high-side transistor and a low-side transistor on and off at different periods to supply power to a load and connect a gate of the high-side transistor to a gate of the low-side transistor so that energy stored in a gate-to-source capacitance of the high-side transistor is directly transferred to the low-side transistor during periods when the gate of the high-side transistor is floating and the low-side transistor gate to source voltage is below the low-side transistor threshold voltage.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

The embodiments described herein provide charge recovery in power converter driver stages by using the gate charge of the high-side transistor of the power stage to directly pre-charge the low-side transistor of the power stage. The direct charge recovery techniques described herein can be applied to some switching regulator architectures, including: buck; buck-boost; push-pull; half-bridge; full-bridge. A buck converter reduces a DC voltage to a lower DC voltage. A buck-boost converter generates an output voltage opposite in polarity to the input. A push-pull converter is a two-transistor converter especially efficient at low input voltages. A half-bridge converter is a two-transistor converter used in many off-line applications. A full-bridge converter is a four-transistor converter usually used in off-line designs that can generate very high output power.

For each type of switching regulator architecture, efficient operation is provided by using the gate capacitance of the high-side transistor to directly pre-charge the low-side transistor of the power stage. The low-side transistor is pre-charged to a secure level below its turn-on threshold to prevent inadvertent turning on of the low-side transistor and to ensure proper operation of the power stage.

Described next are embodiments of the direct charge recovery technique, explained in the context of a synchronous buck power converter. Those skilled in the art will appreciate that the direct charge recovery embodiments described herein can be readily applied to other switching regulator architectures with minor modifications, if any. Such modifications are well within the capability of one of ordinary skill in the art, without requiring undue experimentation.

Figure 1:
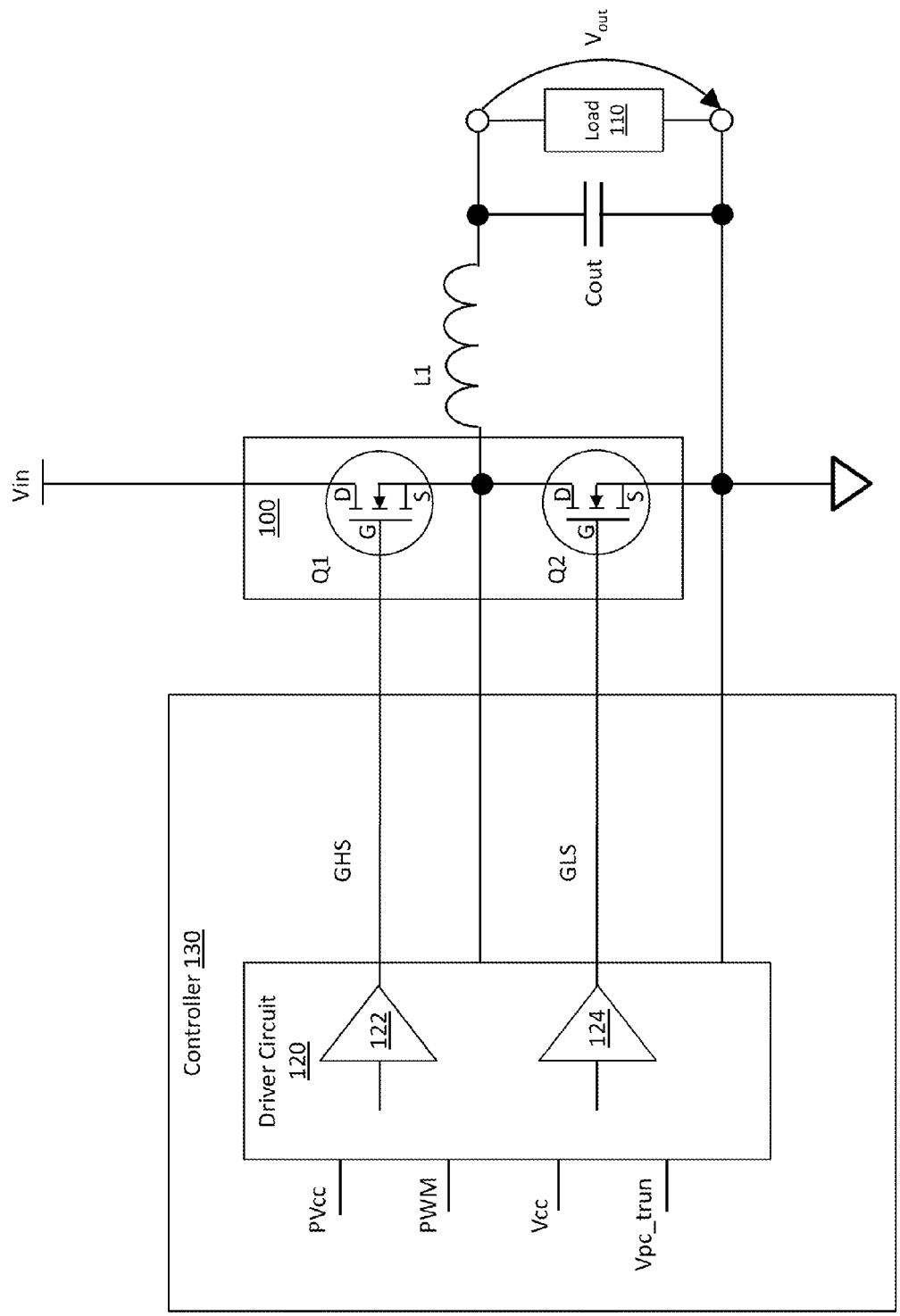
FIG. 1 illustrates a block diagram of a power converter having charge recovery.

FIG. 1 illustrates an embodiment of a synchronous buck power converter comprising a power stage 100 including a high-side (HS) transistor (Q1) and a low-side (LS) transistor (Q2) for coupling to a load 110 through an output inductor (L1) and capacitor (Cout). The high-side transistor Q1 switchably connects the load 110 to an input voltage (Vin) and the low-side transistor Q2 switchably connects the load 110 to ground at different periods. As such, the high-side transistor Q1 sources current to the load 110 through inductor L1 when switched on and the low-side transistor Q2 freewheels inductor current (for positive current) or sinks current (for negative current) from the load 110 through inductor L1 when switched on. A single output phase (Q1/Q2) is shown in FIG. 1, however any number of phases may be provided.

A driver circuit 120 switches the high-side and low-side transistors Q1, Q2 on and off at different periods to supply power to the load 110. To this end, the driver circuit 120 includes a driver 122, 124 for driving each power stage transistor Q1, Q2 with a corresponding gate drive signal (GHS, GLS) to provide an output voltage (Vout) to the load 110. The driver circuit 120 also connects the gate (G) of the high-side transistor Q1 to the gate of the low-side transistor Q2 during periods when both transistors Q1, Q2 are not switched on so that energy stored in the gate-to-source capacitance of the high-side transistor Q1 is directly transferred to the low-side transistor Q2, pre-charging the low-side transistor Q2.

The driver circuit 120 operates under the control of a controller 130 of the power converter. The controller 130 provides signals (PWM, Vpc_trun) and DC supply voltages (PVcc, Vcc) to the driver circuit 120 for controlling operation of the driver circuit 120. As such, the controller 130 switches the transistors Q1, Q2 of the power stage 100 via the driver circuit 120 so that the power stage 100 sources positive current to the load 110 through the high-side transistor Q1 during some periods and sinks negative current from the load 110 through the low-side transistor Q2 or freewheels positive inductor current during other periods. As such, the power converter can operate in a continuous conduction mode (CCM) with current sinking capability.

Under moderate to heavy load conditions, the power converter operates in a PWM (pulse width modulation) mode with a fixed frequency. Under light load conditions, the power converter enters a pulse-frequency-modulation (PFM) low power mode by modulating the frequency which achieves higher efficiency under light load conditions. For example, a PWM input signal to the converter can be tri-stated to support PFM mode. The tristate window is held for as long as the low-side transistor Q2 must remain off. In response, the driver circuit 120 can disable pre-charging of the low-side transistor Q2 when the power converter is functioning in the PFM mode by preventing a direct connection between the gates of the high-side and low-side transistors Q1, Q2 when both transistors Q1, Q2 are not switched on.

In general, the driver circuit 120 can disable the pre-charging function whenever the low-side transistor is prevented from switching. For example, the power converter may be configured in a diode emulation mode during which the low-side transistor does not conduct. The pre-charging function can be disabled when the low-side transistor is prevented from switching e.g. when the converter is configured in passive diode emulation mode with the gate of the low-side transistor Q2 kept off. The pre-charge disablement feature can be turned off or not provided altogether if desired.

The controller 130 can also provide a pre-charge truncation signal (Vpc_trun) to the driver circuit 120 indicating whether the pre-charged gate voltage of the low-side transistor Q2 exceeds a predetermined limit. The predetermined limit is set so that the threshold voltage of the low-side transistor Q2 is not exceeded, preventing inadvertent (early) turning on of the low-side transistor Q2. The driver circuit 120 disconnects the gate of the high-side transistor Q1 from the gate of the low-side transistor Q2 during the pre-charge period if Vpc_trun indicates the gate voltage of the low-side transistor Q2 exceeds the predetermined limit. The transistor gates remain disconnected during the remainder of that pre-charge period.

Figure 2:
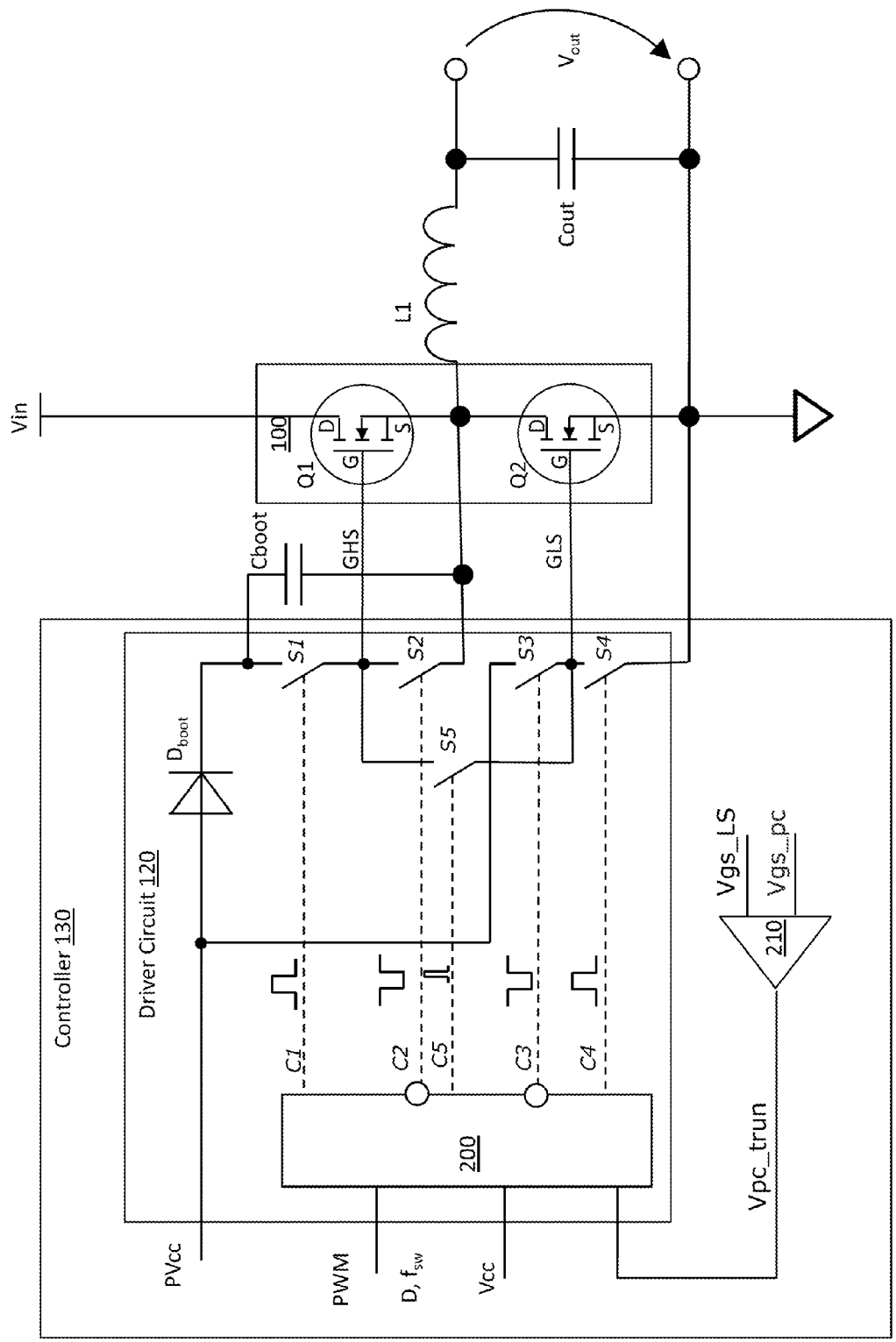
FIG. 2 illustrates another block diagram of a power converter having charge recovery.

FIG. 2 illustrates an embodiment of the driver circuit 120 in more detail. The drivers 122, 124 of the driver circuit 120 and the load 110 are not shown in FIG. 2 for ease of illustration only. Operation of the driver circuit 120 is explained next with reference to the timing diagram of FIG. 3 and the flow diagram of FIG. 4.

The driver circuit is powered by a DC supply voltage (Vcc), and includes a plurality of switches (S1 through S5) for controlling the operational states of the power stage transistors Q1, Q2 and logic 200 for controlling the switches. Various control signals (PWM, Mode, Vpc_trun) generated by the controller 130 are provided to the driver circuit logic 200 for determining the switch states. The driver circuit logic 200 generates a first control signal (C1) for controlling a first switch (S1) which switchably couples the gate of the high-side transistor Q1 to a supply voltage PVcc to turn on transistor Q1. A bootstrap diode (Dboot) and a bootstrap capacitor (Cboot) can be included in the driver circuit 120 for providing charge to turn on the high-side transistor Q1 when switch S1 is closed. The driver circuit logic 200 generates a second control signal (C2) for controlling a second switch (S2) which switchably couples the gate of the high-side transistor Q1 to its source to turn off transistor Q1, a third control signal (C3) for controlling a third switch (S3) which switchably couples the gate of the low-side transistor Q2 to PVcc to turn on transistor Q2, a fourth control signal (C4) for controlling a fourth switch (S4) which switchably couples the gate of the low-side transistor Q2 to its source to turn off transistor Q2, and a fifth control signal (C5) for controlling a fifth switch (S5) which switchably directly connects the gates of the high-side and low-side transistors Q1, Q2 during a particular period of the PWM cycle.

Figure 3:
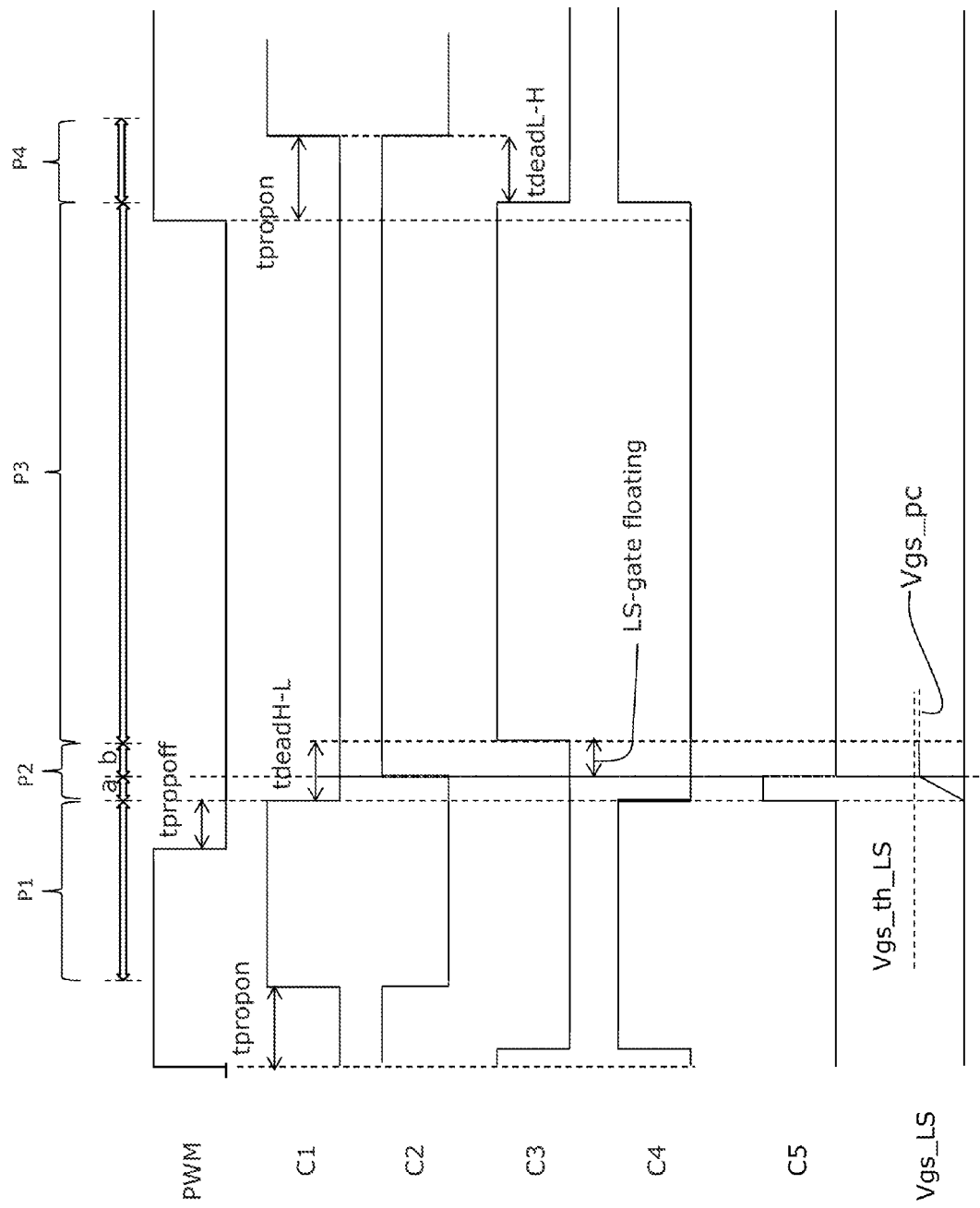
FIG. 3 illustrates a signal timing diagram for a power converter having charge recovery.

FIG. 3 shows the states of the control signals C1 to C5 as a function of the PWM signal provided to the driver circuit logic 200 from the controller 130. The duty cycle (D) and switching frequency (fsw) of the PWM signal is determined by the controller 130. During operation, the driver circuit logic 200 switches on the high-side transistor Q1 (C1 active, C2 inactive) and switches off the low-side transistor Q2 (C3 inactive, C4 active) during a first period P1 after a delay (tpropon) in the rising edge of the PWM signal (Step 400, FIG. 4). The high-side transistor Q1 sources current to the load 110 during period P1. After a delay (tpropoff) in the falling edge of the PWM signal, the driver circuit logic 200 floats the gates of the high-side and low-side transistors Q1, Q2 and connects the floating transistor gates (C1 inactive, C2 inactive, C3 inactive, C4 inactive, C5 active) during a second period P2 (Step 410, FIG. 4). Period P2 corresponds to the high-to-low dead-time ('tdeadH-L' in FIG. 3) of the power converter i.e. a small time interval which prevents simultaneous switching of the high-side and low-side transistors Q1, Q2 during high-to-low transitions. The dead time ensures the power supply is not shorted.

Figure 4:
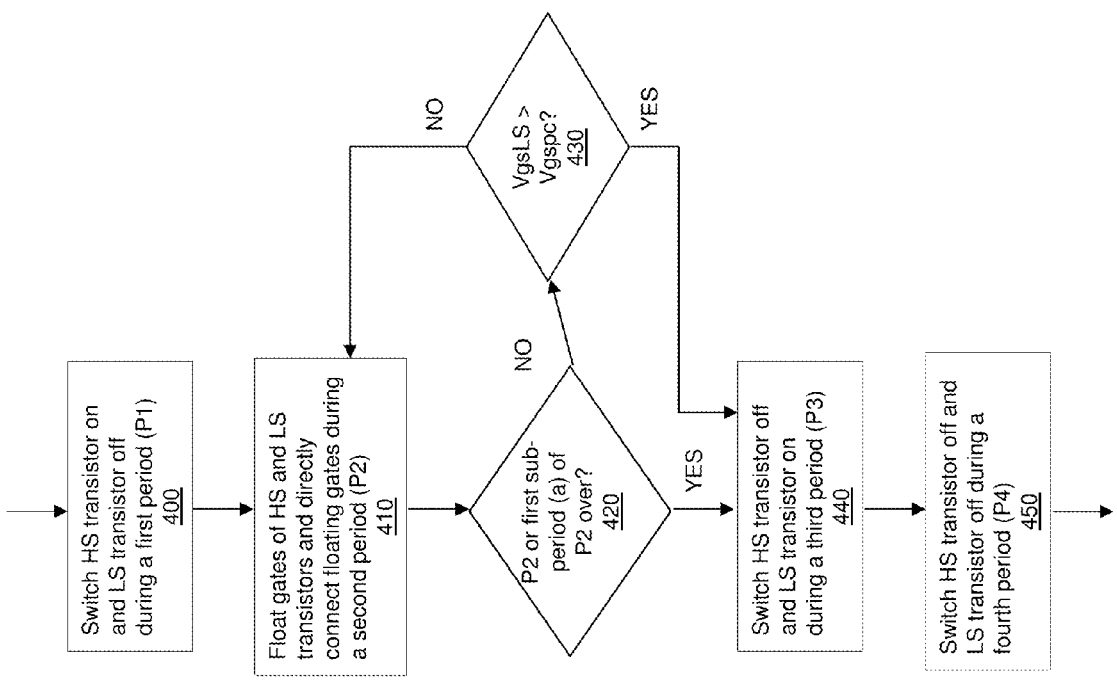
FIG. 4 illustrates a flow diagram of an embodiment of charge recovery for a power converter.

During the high-to-low dead-time represented by period P2, the gates of both transistors Q1, Q2 are floating and directly connected together so that the low-side transistor Q2 is pre-charged by directly transferring energy stored in the gate-to-source capacitance of the high-side transistor Q1 to the low-side transistor Q2 via switch S5 (Step 420, FIG. 4). The term 'float' or 'floating' as used herein means electrically disconnected from a power source or ground.

In one embodiment, the driver circuit logic 200 closes switch S5 during a first sub-period (a) of the second period P2 by activating control signal C5 so that the gates of the high-side and low-side transistors Q1, Q2 are shorted during sub-period a. The driver circuit logic 200 then activates the second control signal (C2) and deactivates the fifth control signal (C5) during a second sub-period (b) of the second period P2. In response, the second switch S2 connects the source of the high-side transistor Q1 to the gate of the high-side transistor Q1 and the fifth switch S5 disconnects the gates of the first and second transistors Q1, Q2 during sub-period b of the second period P2. This way, the gates of the high-side and low-side transistors Q1, Q2 are disconnected and the high-side transistor Q2 switched off while the gate of the low-side transistor Q2 remains floating ('LS-gate floating' in FIG. 3) during the second sub-period b of the second period P2 (C1 inactive, C2 active, C3 inactive, C4 inactive, C5 inactive). The pre-charging of the low-side transistor Q2 is therefore hidden in the high-to-low dead time interval of the power converter.

The driver circuit logic 200 can truncate pre-charging of the low-side transistor Q2 if the gate voltage (Vgs_LS) of the low-side transistor Q2 exceeds a predetermined limit (Vgs_pc). This way, the gate voltage of the low-side transistor Q2 can be kept below the threshold voltage (Vgs_th_LS) of the low-side transistor Q2 during pre-charging, preventing inadvertent turn-on of the low-side transistor Q2 during period P2. In one embodiment, the power converter controller 130 includes a comparator 210 which activates a truncation signal (Vpc_trun) in the event Vgs_LS exceeds Vgs_pc during pre-charging. The driver circuit logic 200 deactivates control signal C5 in response, opening switch S5 and disconnecting the gates of the high-side and low-side transistors Q1, Q2 for the remainder of period P2 (Step 430, FIG. 4).

During the next period P3 of the PWM cycle, the driver circuit logic 200 switches off the high-side transistor Q1 (C1 inactive, C2 active) and switches on the low-side transistor Q2 (C3 active, C4 inactive) during period P3 (Step 440, FIG. 4). The low-side transistor Q2 freewheels inductor current or sinks current from the load 110 during period P3. The driver circuit logic 200 switches off both the high-side transistor Q1 (C1 inactive, C2 active) and the low-side transistor Q2 (C3 inactive, C4 active) during a fourth period P4 of the PWM cycle (Step 450, FIG. 4). Period P4 corresponds to the low-to-high dead-time ('tdeadL-H' in FIG. 3) of the power converter during which simultaneous switching of the high-side and low-side transistors Q1, Q2 is prevented during low-to-high transitions, avoiding shorting of the power supply. The next PWM cycle then begins, and the process is repeated. The driver circuit 120 can disable pre-charging of the low-side transistor Q2 when the low-side transistor Q2 is not conducting e.g. when the power converter is functioning in PFM mode or a diode emulation mode as previously described herein, by preventing a direct connection between the gates of the high-side and low-side transistors Q1, Q2 during period P2.

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A power converter, comprising:
   a first transistor operable to source current to a load when switched on;
   a second transistor operable to freewheel inductor current or sink current from the load when switched on; and
   a driver circuit operable to switch the first transistor on and the second transistor off during a first period, switch the first transistor off and the second transistor on during a third period after the first period, and connect a gate of the first transistor to a gate of the second transistor during a second period between the first and third periods when the gates of the first and second transistors are floating.

2. The power converter of claim 1, wherein the driver circuit is operable to force the gates of the first and second transistors to float during a first sub-period of the second period and switch off the first transistor while the gate of the second transistor remains floating during a second sub-period of the second period following the first sub-period.

3. The power converter of claim 1, wherein the driver circuit is operable to switch the first transistor off and the second transistor off during a fourth period after the third period.

4. The power converter of claim 3, wherein the driver circuit comprises:
   a first switch operable to connect the gate of the first transistor to a supply voltage responsive to a first control signal which is active during the first period;
   a second switch operable to connect a source of the first transistor to the gate of the first transistor responsive to a second control signal which is active during the fourth period;

a third switch operable to connect the gate of the second transistor to the supply voltage responsive to a third control signal which is active during the third period;
a fourth switch operable to connect a source of the second transistor to the gate of the second transistor responsive to a fourth control signal which is active during the fourth period;
a fifth switch operable to connect the gate of the first transistor to the gate of the second transistor responsive to a fifth control signal which is active during the second period; and
logic operable to activate and deactivate the control signals.

5. The power converter of claim 4, wherein the logic is operable to activate the second control signal and deactivate the fifth control signal during the second sub-period of the second period and activate the second control signal during the fourth period so that the second switch connects the source of the first transistor to the gate of the first transistor during the second sub-period of the second period and during the fourth period and the fifth switch connects the gates of the first and second transistors only during the first sub-period of the second period.

6. The power converter of claim 1, wherein the power converter is operable to function in a pulse width modulation mode under moderate and heavy load conditions and in a pulse frequency modulation mode under light load conditions, and wherein the driver circuit is operable to prevent the gates of the first and second transistors from being connected together when the power converter is functioning in the pulse frequency modulation mode.

7. The power converter of claim 1, wherein the driver circuit is operable to prevent the gates of the first and second transistors from being connected together during the second period when the second transistor is prevented from switching.

8. The power converter of claim 1, wherein the driver circuit is operable to disconnect the gate of the first transistor from the gate of the second transistor during the second period if the gate voltage of the second transistor exceeds a predetermined limit.

9. A method of operating a power converter, comprising:
coupling a high-side transistor to a load through an inductor;
coupling a low-side transistor to the load through the inductor;
switching the high-side transistor on and the low-side transistor off during a first period;
switching the high-side transistor off and the low-side transistor on during a third period after the first period; and
connecting a gate of the high-side transistor to a gate of the low-side transistor during a second period between the first and third periods when the gates of the high-side and low-side transistors are floating.

10. The method of claim 9, wherein connecting the gate of the high-side transistor to the gate of the low-side transistor during the second period comprises:
forcing the gates of the high-side and low-side transistors to float during a first sub-period of the second period; and
switching off the high-side transistor while the gate of the low-side transistor remains floating during a second sub-period of the second period following the first sub-period.

11. The method of claim 9, further comprising switching the high-side transistor off and the low-side transistor off during a fourth period after the third period.

12. The method of claim 11, wherein connecting the gate of the high-side transistor to the gate of the low-side transistor during the second period comprises:
connecting the gate of the high-side transistor to a supply voltage responsive to a first control signal which is active during the first period;
connecting a source of the high-side transistor to the gate of the high-side transistor responsive to a second control signal which is active during the fourth period;
connecting the gate of the low-side transistor to the supply voltage responsive to a third control signal which is active during the third period;
connecting a source of the low-side transistor to the gate of the low-side transistor responsive to a fourth control signal which is active during the fourth period; and
connecting the gate of the high-side transistor to the gate of the low-side transistor responsive to a fifth control signal which is active during the second period.

13. The method of claim 12, further comprising activating the second control signal during the second sub-period of the second period and during the fourth period so that the second switch connects the source of the high-side transistor to the gate of the high-side transistor during the second sub-period of the second period and during the fourth period.

14. The method of claim 9, wherein the power converter is operable to function in a pulse width modulation mode under moderate and heavy load conditions and in a pulse frequency modulation mode under light load conditions, the method further comprising preventing the gates of the high-side and low-side transistors from being connected together when the power converter is functioning in the pulse frequency modulation mode.

15. The method of claim 9, further comprising disconnecting the gate of the high-side transistor from the gate of the low-side transistor during the second period if the gate voltage of the low-side transistor exceeds a predetermined limit.

16. A power converter, comprising:
a high-side transistor for coupling to a load through an inductor;
a low-side transistor for coupling to the load through the inductor; and
a driver circuit operable to switch the high-side and low-side transistors on and off at different periods to supply power to the load, and connect a gate of the high-side transistor to a gate of the low-side transistor so that energy stored in a gate-to-source capacitance of the high-side transistor is directly transferred to the low-side transistor during periods when the gates of the high-side and low-side transistors are floating to pre-charge the low-side transistor.

17. A synchronous buck converter, comprising:
an output inductor for coupling to a load;
a first transistor operable to source current to the load through the output inductor when switched on;
a second transistor operable freewheel inductor current or sink current from the load through the inductor when switched on; and
a driver circuit operable to switch the first transistor on and the second transistor off during a first period, switch the first transistor off and the second transistor on during a third period after the first period, and connect a gate of the first transistor to a gate of the second transistor during a second period between the first and third periods when the gates of the first and second transistors are floating.

18. A power stage driver, comprising circuitry operable to switch a high-side transistor and a low-side transistor on and off at different periods to supply power to a load and connect a gate of the high-side transistor to a gate of the low-side transistor so that energy stored in a gate-to-source capacitance of the high-side transistor is directly transferred to a gate-to-source capacitance of the low-side transistor during periods when the gates of both transistors are floating and the low-side transistor gate to source voltage is below the low-side transistor threshold voltage.

19. The power stage driver of claim 18, wherein the circuitry is operable to force the gates of the high-side and low-side transistors to float and be connected during a first sub-period of the second period and switch off the high-side transistor and disconnect the gates of the high-side and low-side transistors while the gate of the low-side transistor remains floating during a second sub-period of the second period following the first sub-period.

20. The power stage driver of claim 18, wherein the circuitry is operable to switch the high-side transistor off and the low-side transistor off during a fourth period after the third period.

21. The power stage driver of claim 20, wherein the circuitry comprises:
a first switch operable to connect the gate of the high-side transistor to a supply voltage responsive to a first control signal which is active during the first period;
a second switch operable to connect a source of the high-side transistor to the gate of the high-side transistor responsive to a second control signal which is active during the fourth period;
a third switch operable to connect the gate of the low-side transistor to the supply voltage responsive to a third control signal which is active during the third period;
a fourth switch operable to connect a source of the low-side transistor to the gate of the low-side transistor responsive to a fourth control signal which is active during the fourth period;
a fifth switch operable to connect the gate of the high-side transistor to the gate of the low-side transistor responsive to a fifth control signal which is active during the second period; and
logic operable to activate and deactivate the control signals.

22. The power stage driver of claim 21, wherein the logic is operable to activate the second control signal and deactivate the fifth control signal during the second sub-period of the second period and activate the second control signal during the fourth period so that the second switch connects the source of the high-side transistor to the gate of the high-side transistor during the second sub-period of the second period and during the fourth period and the fifth switch connects the gates of the high-side and low-side transistor only during the first sub-period of the second period.

23. The power stage driver of claim 18, wherein the circuitry is operable to disconnect the gate of the high-side transistor from the gate of the low-side transistor during the second period if the gate voltage of the low-side transistor exceeds a predetermined limit.

* * * * *